United States Patent
Kishbaugh et al.

(10) Patent No.: US 12,240,155 B2
(45) Date of Patent: Mar. 4, 2025

(54) CO-INJECTION MOLDING OF FOAM ARTICLES

(71) Applicant: Trexel, Inc., Wilmington, MA (US)

(72) Inventors: Levi A. Kishbaugh, Groveland, MA (US); Scott E. Ludwig, Nokomis, FL (US)

(73) Assignee: Trexel, Inc., Wilmington, MA (US)

( * ) Notice: Subject to any disclaimer, the term of this patent is extended or adjusted under 35 U.S.C. 154(b) by 117 days.

(21) Appl. No.: 17/869,417

(22) Filed: Jul. 20, 2022

(65) Prior Publication Data

US 2024/0025090 A1    Jan. 25, 2024

(51) Int. Cl.
| | |
|---|---|
| *B29C 44/06* | (2006.01) |
| *B29C 44/42* | (2006.01) |
| *B29K 105/00* | (2006.01) |
| *B29K 105/26* | (2006.01) |
| *B29L 9/00* | (2006.01) |

(52) U.S. Cl.
CPC .............. *B29C 44/06* (2013.01); *B29C 44/42* (2013.01); *B29K 2105/0032* (2013.01); *B29K 2105/26* (2013.01); *B29K 2995/0039* (2013.01); *B29K 2995/004* (2013.01); *B29L 2009/00* (2013.01)

(58) Field of Classification Search
CPC ...... B29C 44/06; B29C 44/42; B29L 2009/00
USPC ....................................................... 264/45.1
See application file for complete search history.

(56) References Cited

U.S. PATENT DOCUMENTS

| | | | | |
|---|---|---|---|---|
| 5,221,507 | A * | 6/1993 | Beck | .................. B29C 45/1646 |
| | | | | 264/513 |
| 2005/0159548 | A1* | 7/2005 | Ibar | ........................ B29C 67/24 |
| | | | | 525/96 |
| 2016/0264776 | A1* | 9/2016 | Wolfe | ...................... C08J 5/046 |
| 2019/0270227 | A1* | 9/2019 | Dix | .................... B29C 44/3453 |

* cited by examiner

*Primary Examiner* — Hannah J Pak
(74) *Attorney, Agent, or Firm* — Wolf, Greenfield & Sacks, P.C.

(57) ABSTRACT

Articles comprising a skin layer comprising virgin polymer and a core layer comprising a recycled polymer, along with associated systems and methods, are generally provided.

13 Claims, 6 Drawing Sheets

CO-INJECTION MOLDING OF FOAM ARTICLES

TECHNICAL FIELD

The present invention relates generally to polymer processing and, more particularly, to methods of injection molding articles comprising skin layers that include virgin polymer and a foamed core layer that includes recycled polymer.

BACKGROUND

Recycling of polymers is important for environmental reasons, including the reduction of plastic waste and the reduction in commercial demand for virgin polymers. Virgin polymers often offer improved performance over recycled polymers. For example, virgin polymers may have more desirable mechanical properties, improved formability, and brighter color than recycled polymers.

SUMMARY

Articles with skin layers comprising virgin polymer that at least partially enclose recycled polymers, and associated systems and methods, are generally described. The subject matter of the present invention involves, in some cases, interrelated products, alternative solutions to a particular problem, and/or a plurality of different uses of one or more systems and/or articles.

According to one aspect, a method of injection molding an article is provided. In some embodiments, the method comprises: injecting a first fluid stream comprising a first polymeric material into a mold cavity; injecting a second fluid stream comprising a second polymeric material and a blowing agent into the mold cavity to form a core; and extracting the article from the mold cavity; wherein the first polymeric material comprises a virgin polymer and the second polymeric material comprises a recycled polymer.

According to another aspect, a method of injection molding an article is provided. In some embodiments, the method comprises: injecting a first fluid stream comprising a first polymeric material into a mold cavity; prior to completion of the injection of the first fluid stream, injecting a second fluid stream comprising a second polymeric material and a blowing agent into the mold cavity to form a core; and extracting the article from the mold cavity; wherein the first polymeric material comprises a virgin polymer and the second polymeric material comprises a recycled polymer.

In another aspect, an injection molded article is provided. In some embodiments, the article comprises: a skin layer comprising a first polymeric material at least partially enclosing a foamed core comprising a second polymeric material, wherein the first polymeric material comprises a virgin polymer and the second polymeric material comprises a recycled polymer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Articles comprising a skin layer comprising virgin polymer and a core layer comprising a recycled polymer, along with associated methods, are generally provided. A method for producing the article may utilize injection of multiple fluid streams that comprise the virgin polymer and/or the recycled polymer. The methods described herein are particularly well suited for processes that produce injection molded foam articles. In some embodiments, the methods are designed to reduce the use of virgin polymer, which may provide environmental and cost advantages.

Figure 1:
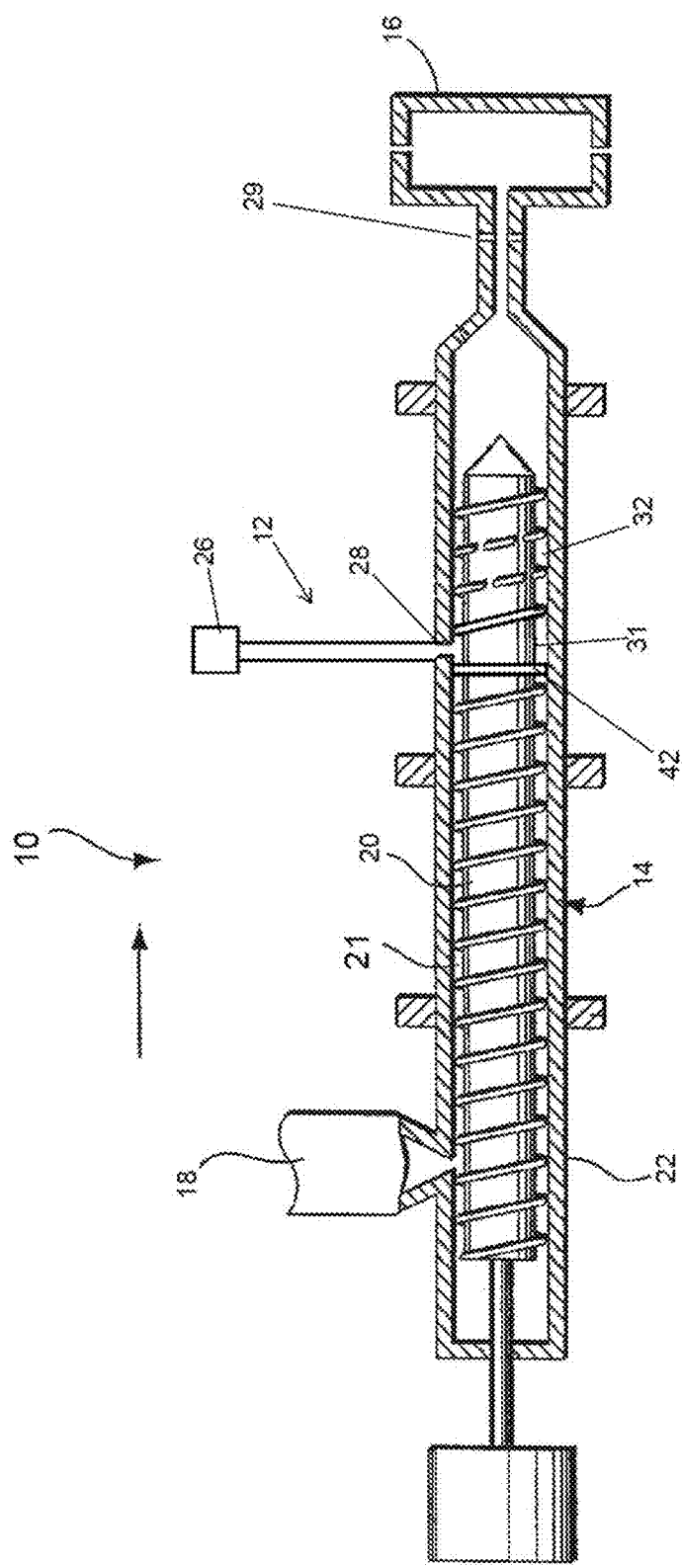
FIG. 1 schematically illustrates a portion of polymer processing system comprising an extruder and a mold, according to some embodiments.

Referring to FIG. 1, a portion of a polymer processing system 10 is schematically shown. In this embodiment, the system is an injection molding system that includes an extruder 14 and a mold 16. A hopper 18 provides polymeric material (e.g., in the form of pellets) to extruder 14. The extruder includes a screw 20 designed to rotate within a barrel 22 to plasticate polymeric material. Heat (e.g., provided by heaters on the extruder barrel) and shear forces (e.g., provided by the rotating screw) act to melt the polymeric material to form a fluid polymeric stream. The stream is conveyed in a downstream direction by the rotation of the screw.

The system is configured to introduce a blowing agent into the fluid stream, in some embodiments. Generally, a blowing agent is used to produce a foamed portion of an article, such as a foamed core. However, a blowing agent may not be used when preparing a solid portion of an article (e.g., a solid skin layer of an article). The blowing agent may be a physical blowing agent and/or a chemical blowing agent. Polymer-processing system 10, of FIG. 1 comprises an exemplary blowing agent introduction system 12 used to deliver physical blowing agent (e.g., nitrogen and/or carbon dioxide). Blowing agent introduction system 12 may be omitted or shut off when an extruder is used to extrude a non-foamed portion of an article (e.g., solid skin layer). The blowing agent introduction system includes a physical blowing agent source 26 (e.g., nitrogen) that is connected to one or more port(s) 28 in the barrel of extruder 14. The system is configured to control the flow of physical blowing agent from the source into the fluid polymeric stream in extruder 14. The location on the screw at which blowing agent is introduced is referred to herein as a blowing agent receiving section 31. The screw may include sections specifically designed to receive blowing agent and/or mix blowing agent (e.g., in a mixing section 32) downstream of the introduction location. The mixing section may be omitted in embodiments where a blowing agent is not mixed into the fluid stream.

In some embodiments, the physical blowing agent is introduced discontinuously into the polymeric material. That is, physical blowing agent introduction into the polymeric material in the extruder may be stopped during a portion of the process. For example, it may be advantageous for the blowing agent flow to be stopped during at least a portion (and, in some cases, substantially all) of the time when the screw ceases to rotate and convey polymeric material in a downstream direction such as when polymeric material and blowing agent mixture is being injected into the mold. It should be understood that various techniques may be used to provide discontinuous blowing agent introduction. Suitable techniques, for example, have been described in U.S. Pat. Nos. 9,180,350; 8,137,600; 6,926,507; 6,616,434; and 6,602,063, each of which is incorporated herein by reference in its entirety.

The polymeric material and blowing agent (if present) may be conveyed in a downstream direction in the extruder barrel by rotation of the screw. In some embodiments, the mixture of polymeric material and blowing agent is a single-phase fluid. For example, the blowing agent, if present, may be dissolved in the polymeric material prior to injection of the polymeric material into the mold.

A shot of the polymeric material or mixture of the polymeric material and the blowing agent (e.g., single-phase solution) may be accumulated downstream of the screw within the extruder causing the screw to retract in an upstream direction within the barrel. When suitable conditions have been reached (e.g., after a predetermined time period, at a predetermined screw position, etc.), the screw stops retracting and rotating to end a plastication period of the molding cycle. During the injection period of the molding cycle, the screw may be forced downstream within the barrel to an injection position to inject the mixture into a cavity of the mold while a valve 29 associated with the outlet of the extruder is opened. The mixture is subjected to a pressure drop during injection, which nucleates a large number of cells and a polymer article is formed in the mold. The screw may begin to rotate once again to begin another molding cycle. The method is typically repeated to produce multiple polymeric articles.

Though the blowing agent introduction system is illustrated as being used in conjunction with an injection molding system, it should be understood that the blowing agent introduction system may be used in conjunction with other types of polymer processing systems.

Figure 2:
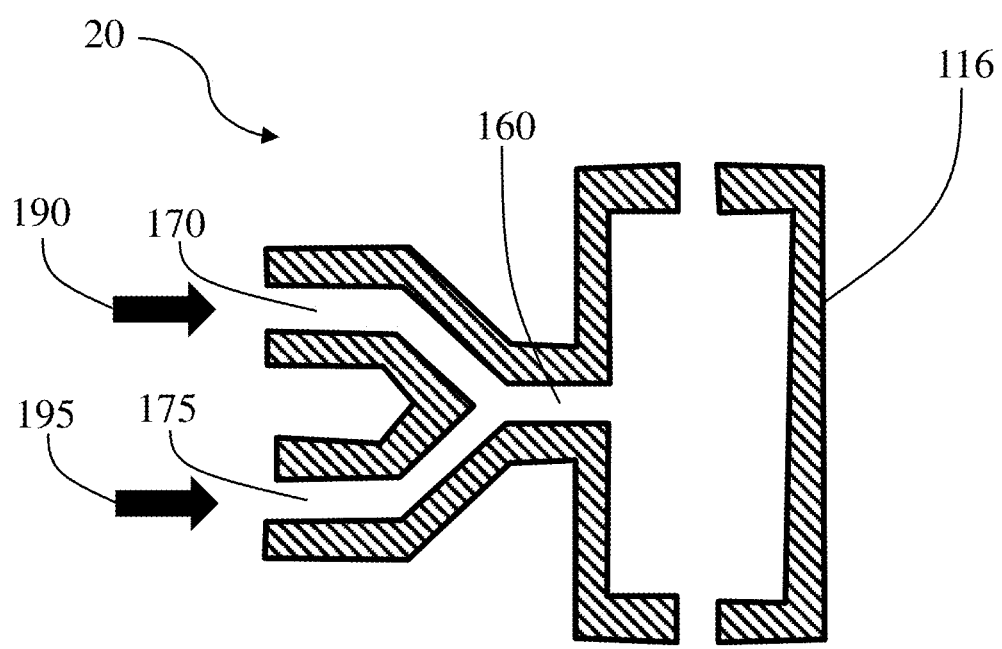
FIG. 2 schematically illustrates a portion of polymer processing system comprising a mold and multiple fluid channels for injection of fluid streams, according to some embodiments.

In some embodiments, separate fluid polymeric streams are formed by separate extruders of the polymer processing system. The formation of separate fluid streams may facilitate co-injection molding for forming a polymeric article. In some embodiments, a first fluid stream comprising a first polymeric material and a second fluid stream comprising a second polymeric material are injected into a mold cavity. In some embodiments, a first fluid stream is formed using a first extruder, and a second fluid stream is formed using a second extruder. FIG. 2 presents a schematic of a non-limiting portion of a fluidic system 20 that is configured to inject first fluid stream 190 (which may flow from a first upstream extruder, not shown) and second fluid stream 195 (which may flow from a second upstream extruder, not shown). In some embodiments, first fluid stream 190 comprises a first polymeric material, which may be or comprise a virgin polymer (as discussed in greater detail below). Second fluid stream 195 may comprise a second polymeric material that may be or comprise a recycled polymer (as discussed in greater detail below) and blowing agent.

The first fluid stream and the second fluid stream may be delivered to the mold through one or more fluid channels. The first fluid stream may be injected into mold 116 through first fluid channel 170 and the second fluid stream may be directed into mold 116 through second fluid channel 175. First fluid channel 170 and second fluid channel 175 may each be fluidically connected to mold 116 by an injection channel 160, such that fluid flowing through first fluid channel 170 or second fluid channel 175 flows to mold 116 through a gate via injection channel 160, as shown in FIG. 1. It should be understood that although FIG. 2 presents an embodiment that includes only a single injection channel 160 and mold 116, in some embodiments fluidic system 20 comprises multiple injection channels 160 and multiple molds 116. For example, fluid streams 190 and 195 could be directed towards two or more cavities of mold 116 via branched injection channels that can each be connected to either or both of fluid streams 190 and 195 during operation of fluidic system 120.

The individual flow rate of a fluid stream into the mold may be controlled independently of the flow rates of other fluid streams. For example, the flow rate of a fluid stream into the mold may be regulated by a valve upstream from the mold, and/or by settings of an extruder that drives the fluid stream.

The first fluid flow and the second fluid stream may be injected independently of one another. In some embodiments, a first fluid stream and a second fluid stream are injected simultaneously during at least a portion of the injection of the first fluid stream. For example, in some embodiments an article is formed by performing, in order, a first step of injecting a first fluid stream; a second step of injecting the first fluid stream and the second fluid stream simultaneously, such that the second fluid stream is at least partially enclosed by the first fluid stream; and a third step of injecting the first fluid stream. In some embodiments, the second fluid stream is injected prior to completion of the injection of the first fluid stream.

Figure 3A:
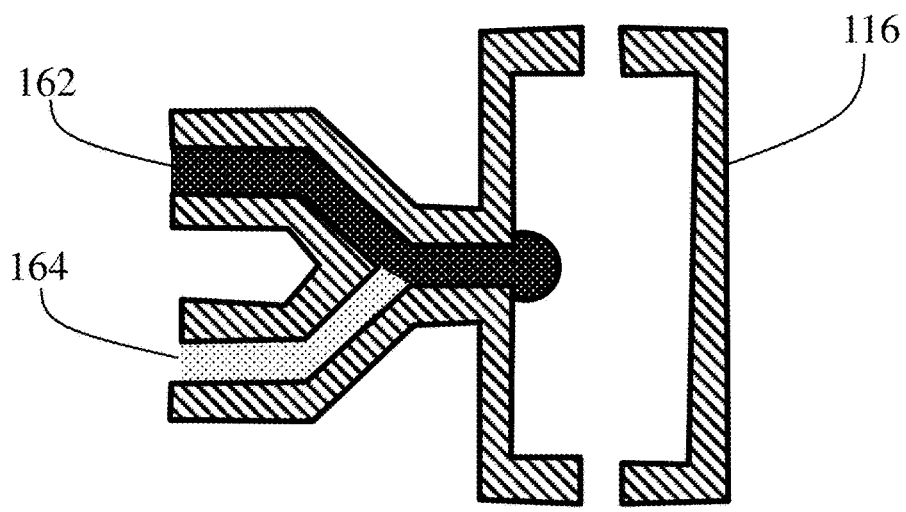
FIGS. 3A-3C schematically illustrate injection molding of an article, according to some embodiments.
Figure 3B:
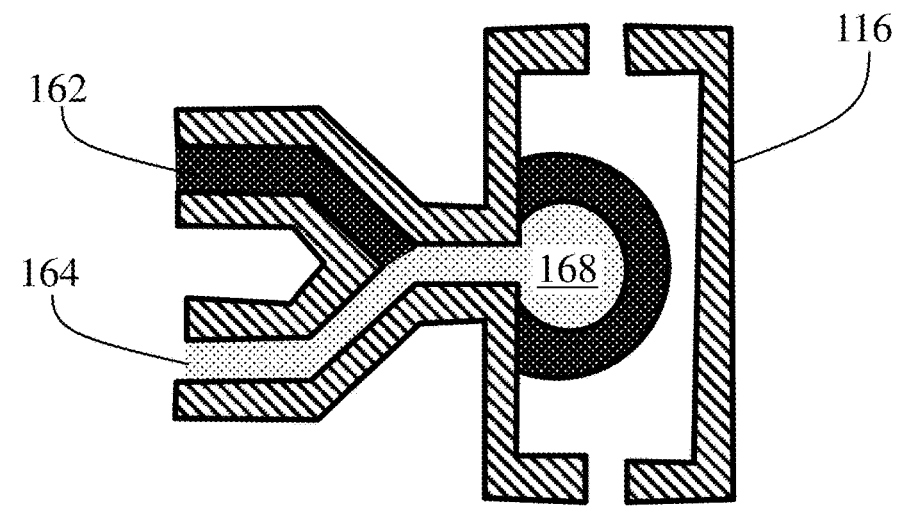
Figure 3C:
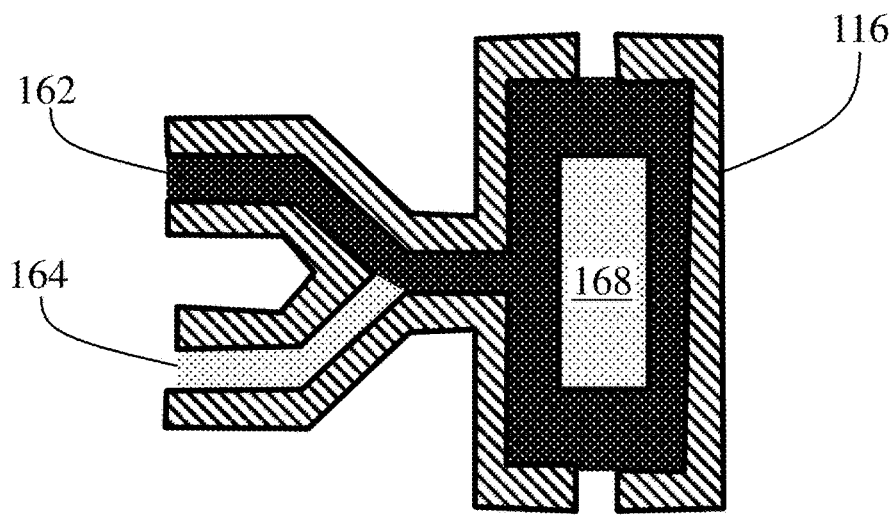

In some embodiments, the first fluid stream and the second fluid stream are not injected simultaneously. For example, the first fluid stream may be injected at a different time than the second fluid stream. In some embodiments, an article is formed by performing, in order, a first step of injecting a first fluid stream (e.g., with no blowing agent present), a second step of injecting a second fluid stream (e.g., with blowing agent present), and a third step of injecting the first fluid stream once again (e.g., with no blowing agent present). FIGS. 3A-3C schematize a non-limiting example of such a method. As shown in FIGS. 3A-3C, first fluid 162 and second fluid 164 may be injected into mold 116 through a portion of the system as schematized in FIG. 2. FIG. 3A illustrates a first step, where first fluid 162 is injected into mold 116. FIG. 3B illustrates a second step, where the flow of first fluid 162 is halted, and second fluid 164 is injected into mold 116. In some embodiments, injecting second fluid 164 into the mold after injection of first fluid 162 forms core 168. As shown in FIG. 3C, in some embodiments, flow of first fluid 162 is resumed after the flow of second fluid 164 is stopped, to cover the injection site with a first polymeric material included within first fluid 162. Once the injection process is complete, the injection molded article may be extracted from the mold. It should be understood that the polymer processing system may include a number of conventional components not illustrated in the figures.

Generally, a blowing agent is used to form the foam core of the injection molded articles described herein.

The blowing agent may facilitate expansion of at least a portion of the injection molded article (e.g., the core). In some embodiments, once the injection of the fluid streams is complete, the resulting article may be held in the mold temporarily, to allow a skin layer comprising the first polymeric material to harden. Then, the mold cavity may be expanded to permit expansion of the core of the article to form an expanded foam structure, such as a box structure, in the core of the article. Alternatively, the resulting article may be held in the mold for long enough to allow the entire article to harden, and may be extracted from the mold without a step of expanding the mold cavity.

Prior to expansion of the mold cavity, the article may be held in the mold cavity for any of a variety of appropriate hold times. For example, the article may be held in the mold cavity for a period of greater than or equal to 0 seconds, greater than or equal to seconds, greater than or equal to 1 seconds, greater than or equal to 1.5 seconds, or greater than or equal to 2 seconds after the injection of the fluid streams and before expansion of the mold cavity. In some embodiments, the article is held for less than or equal to 5 seconds, less than or equal to 4 seconds, less than or equal to 3 seconds, or less than or equal to 2 seconds after the injection of the fluid streams and before expansion of the mold cavity. Combinations of these ranges are also possible. For example, in some embodiments, the article may be held in the mold cavity for greater than or equal to 0 seconds and less than or equal to 5 seconds after the injection of the fluid streams and before expansion of the mold cavity. As another example, in some embodiments, the article may be held in the mold cavity for greater than or equal to 0 seconds and less than or equal to 2 seconds after the injection of the fluid streams and before expansion of the mold cavity As noted above, the methods described herein may utilize a blowing introduction system to introduce physical blowing agent into the polymeric material. The physical blowing agent may be an inert gas, in some embodiments. For example, the physical blowing agent may comprise nitrogen, carbon dioxide, and/or noble gasses such as argon. In some embodiments, the blowing agent introduction system may include a metering device (or system) between the physical blowing agent source and the port(s). The metering device can be used to meter the physical blowing agent so as to control the amount of the physical blowing agent in the mixture within the extruder to maintain a level of physical blowing agent at a particular level. For example, the device meters the mass flow rate of the physical blowing agent.

Generally, the amount of blowing agent (e.g., nitrogen and/or carbon dioxide) is less than about 10% by weight based on the total weight of polymeric material. In many embodiments, the blowing agent level is less than about 5%, in others, less than about 3%, and, in others, less than about 1% based on the total weight of polymeric material. In particular, when nitrogen is used as the blowing agent, the amount of nitrogen may be less than 0.1 weight percent based on the weight of the polymeric material (e.g., between and 0.03 weight percent based on the weight of the polymeric material). In some embodiments, the blowing agent is present in an amount greater than about 0.2 weight percent or about 0.5 weight percent based on the weight of the polymeric material. In general, methods described herein may utilize any suitable chemical blowing agent. For example, methods described herein may utilize a chemical blowing agent capable of producing carbon dioxide under conditions in the extruder. The chemical blowing agent may undergo a reaction (e.g., a decomposition reaction) to form carbon dioxide upon being heated in the extruder. Suitable chemical blowing agents may include acids and/or alkalis. In some embodiments, suitable chemical blowing agent may comprise citric acid, sodium bicarbonate, monosodium citrate, dinitroso pentamethylenetetramine (DPT), oxybis (benzenesulfonyl hydrazide) (OBSH), p-toluenesulfonyl hydrazide (TSH), p-toluenesulfonyl semicarbazide (TSS) and calcium carbonate. It should be understood that the reactions that produce carbon dioxide may also produce other by-products which may be detectable in the final molded article. Embodiments of chemical blowing agents capable of producing carbon dioxide may be preferred in some embodiments. However, in other embodiments, methods described herein may utilize a chemical blowing agent capable of producing another inert gas, such as nitrogen, under conditions in the extruder.

The chemical blowing agents used in the methods described herein may have any suitable form. In some cases, the chemical blowing agents may be in the form of pellets. In some cases, the chemical blowing agents may be in the form of particles. Other forms may also be also suitable such as flakes, powder or liquid. It should also be understood that the pellets and/or particles (or other forms) may include other components (e.g., non-reactive components) in addition to the chemical blowing agent. In some cases, the particles may have small particle sizes such as less than 10 micron and/or less than 1 micron. For example, some such chemical blowing agent particles have been described in U.S. Pat. No. 8,563,621 which is incorporated herein by reference in its entirety.

In general, the chemical blowing agents may be introduced into the polymeric material in the extruder in any suitable manner. As described above, in some embodiments, chemical blowing agents may be introduced into the extruder via the hopper. That is, the chemical blowing agent (e.g., in the form of pellets and/or particles) may be added to the hopper along with the polymeric material (e.g., in the of pellets) and other additives. It should be understood that the chemical blowing agents may also be introduced into the extruder downstream of the polymeric material (e.g., through another port in the barrel or otherwise).

Figure 4A:
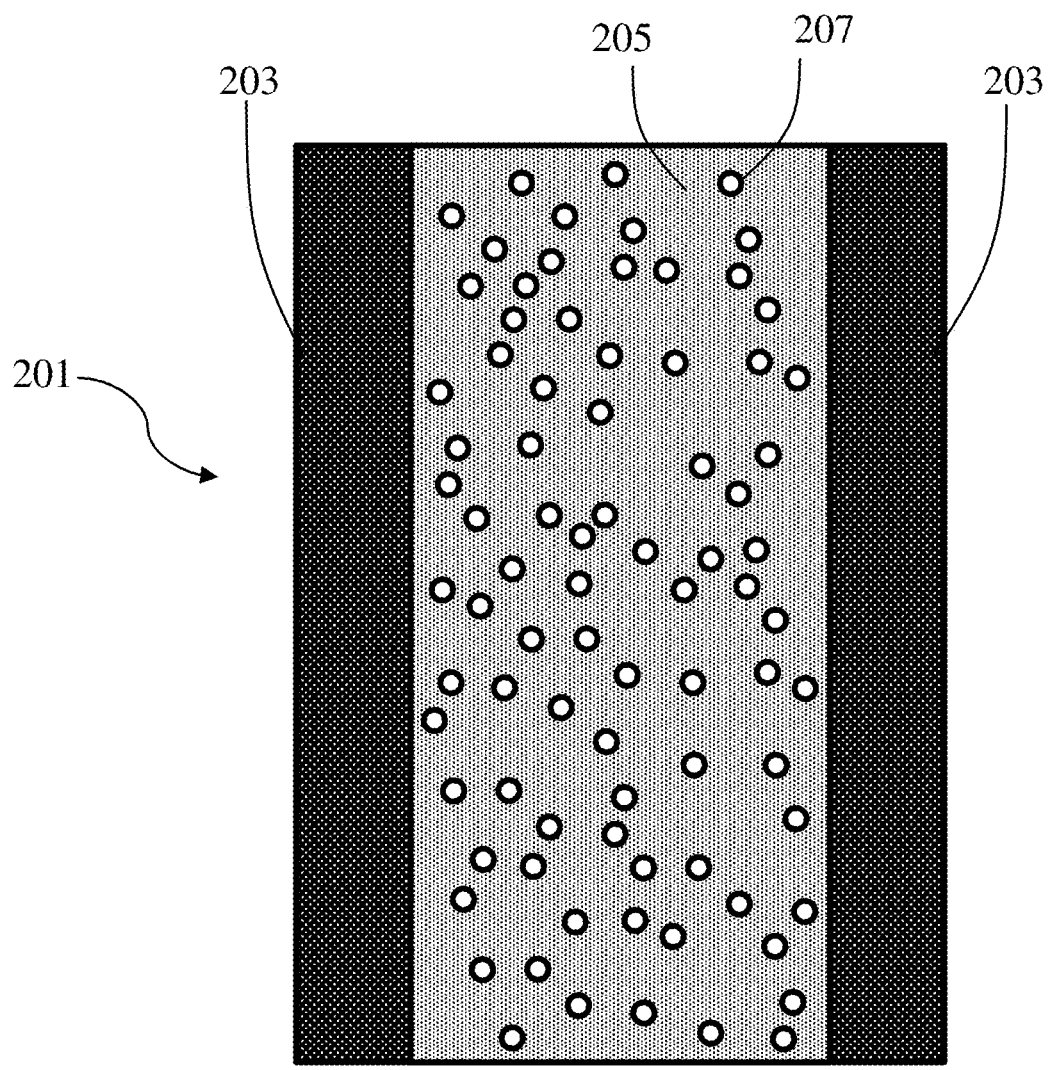
FIG. 4A schematically illustrates a cross-section of an exemplary article, according to some embodiments.
Figure 4B:
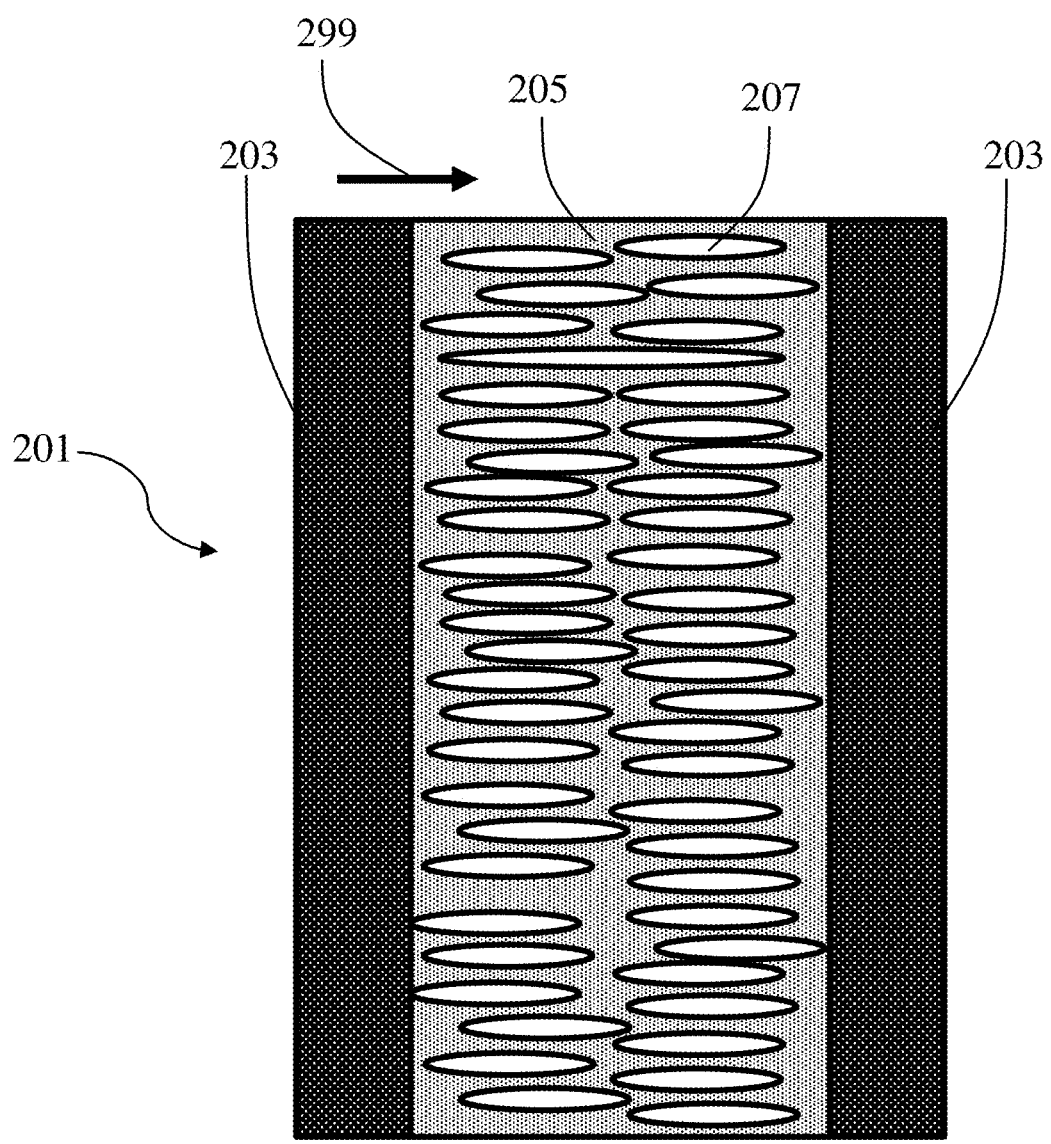
FIG. 4B schematically illustrates a cross-section of an exemplary article, according to some embodiments.

In another aspect, the present disclosure is directed towards injection molded articles. The article may be prepared by an injection molding method described above. FIGS. 4A-4B provide schematic illustrations of cross-sections of non-limiting articles 201, according to some embodiments.

As noted above, the article comprises a skin layer comprising a first polymeric material. In general, the skin layer is formed of a solid polymeric material (in contrast with the foamed core described below). For example, an article 201 of FIG. 4A comprises a skin layer 203 that comprises solid polymeric material, and a core 205 that is foamed. The skin layer may provide mechanical strength to the article. For example, the skin layer of the article may have higher mechanical strength and/or greater crack resistance than a core of the article. Without wishing to be bound by theory, the improved mechanical strength and/or crack resistance may result from a greater density and/or a higher proportion of virgin polymeric material within the skin layer, relative to the core of the article. The skin layer may also favorably improve aesthetic properties of the article. For example, as discussed in greater detail below, the skin layer may have improved colorability, relative to other portions of the article, such as the core of the article. In some embodiments, the skin layer provides functional utility that other portions of the article the article, such as the core, are unsuited for. For example, a food-grade article may be produced using a food-grade skin layer and a non-food-grade core, according to some embodiments.

The skin layer may have any of a variety of appropriate thicknesses. For example, in some embodiments, the skin layer has a thickness of greater than or equal to 150 microns, greater than or equal to 200 microns, greater than or equal to 250 microns, greater than or equal to 300 microns, or greater. In some embodiments, the skin layer has a thickness of less than or equal to 700 microns, less than or equal to 500 microns, less than or equal to 400 microns, less than or equal to 300 microns, less than or equal to 200 microns, less than or equal to 175 microns, less than or equal to 150 microns, less than or equal to 100 microns, or less. Combinations of these ranges are also possible. For example, the skin layer may have a thickness of greater than or equal to 50 microns and less than or equal to 200 microns. Other core thicknesses are also possible.

In some embodiments, virgin material is preferred for use in a skin layer as a result of its improved mechanical properties, improved colorability, etc. An article comprising a skin layer including a high proportion of virgin material may have a number of aesthetic, functional, and/or mechanical advantages over an article comprising an identical proportion of recycled polymer, homogeneously distributed throughout the polymeric material of the article. One advantage of the injection molded articles described herein is that they may be used to create articles that comprise recycled polymer, but that provide the visual, mechanical, and/or functional benefits of virgin polymer as a result of the fact that their skin layer comprises little, if any, recycled polymer. The skin layer may comprise a relatively small proportion (e.g., less than 15%, less than 10%, or less than 5%) of recycled polymer. In some embodiments, the skin layer is free of any recycled polymer.

When present, the recycled polymer may be added deliberately to the skin layer (e.g., when it is recognized that a dilute amount of recycled polymer may be incorporated into a first fluid stream without sacrificing performance of the resulting skin layer). Alternatively or additionally, some recycled polymer may be introduced into the skin layer during formation of the article. For example, without wishing to be bound by any particular theory, the skin layer may blend with the core along the interface between the skin layer and the core, forming a composition gradient between the two materials.

In general, the skin layer at least partially encloses (e.g., completely encloses) the core. For example, referring again to FIG. 4A, skin layer 203 of article 201 completely encloses foamed core 205. Alternatively, the skin layer may enclose some but not all of the core.

The core may comprise a second polymeric material. The skin layer may be integrally formed with a core of an article. In some embodiments, the interface between the core and the skin layer are blended, such that a composition gradient between the core and the skin layer is formed.

The foamed core comprises cells. Referring again to FIG. 4A, foamed core 205 comprises cells 207. The cells may be elongated in a particular direction. For example, FIG. 4B is similar to FIG. 4A, but shows article 201 comprising skin layer 203 that completely encloses core 205 comprising cells 207 that are expanded in direction 299. The presence of the cells results in a density reduction of the core of the article. For example, in some embodiments a foamed core has experienced a density reduction as a result of expansion of the article within the mold. The core may have a lower strength or aesthetic appeal than the skin layer, e.g., as a result of its lower density.

Generally, the core of the article is a layer. In some such embodiments, at least a portion of the article is tri-layered, with a skin layer-core layer-skin layer structure. For example, article 201 of FIG. 4A is a non-limiting schematic example of such an article, where skin layers 203 and core layer 205 form a tri-layered structure with a skin layer-core layer-skin layer structure. In some such embodiments, the skin layer is wrapped around an edge of the core layer, such that the skin layer is a continuous, folded layer that at least partially encloses the core layer.

A non-expanded core (e.g., an as-molded core or a core of an article that has hardened in the mold cavity prior to extraction from the mold cavity) may have any of a variety of appropriate thicknesses. For example, in some embodiments, the non-expanded core has a thickness of greater than or equal to 100 microns, greater than or equal to 150 microns, greater than or equal to 200 microns, greater than or equal to 300 microns, greater than or equal to 400 microns, or greater. In some embodiments, the non-expanded core has a thickness of less than or equal to 700 microns, less than or equal to 600 microns, less than or equal to 500 microns, or less. Combinations of these ranges are also possible. For example, the non-expanded core may have a thickness of greater than or equal to 100 microns and less than or equal to 700 microns. Other non-expanded core thicknesses are also possible.

In some embodiments, a non-expanded core (e.g., an as-molded core or a core of an article that has hardened in the mold cavity prior to extraction from the mold cavity) has a thickness that is greater than or equal to 5%, greater than or equal to 10%, greater than or equal to 20%, or greater than or equal to 30% of a total thickness of the article. In some embodiments, the non-expanded core has a thickness that is less than or equal to 60%, less than or equal to 50%, less than or equal to 40%, less than or equal to 30%, or less of the total thickness of the article. Combinations of these ranges are also possible. For example, in some embodiments the non-expanded core may have a thickness greater than or equal to 5% and less than or equal to 60% of the total thickness of the article.

In embodiments where the mold cavity is expanded to allow expansion of the article, the article may expand to have a core having any of a variety of appropriate thicknesses. For example, in some embodiments, the expanded core has a thickness of greater than or equal to 200 microns, greater than or equal to 300 microns, greater than or equal to 400 microns, greater than or equal to 500 microns, greater than or equal to 600 microns, or greater. In some embodiments, the expanded core has a thickness of less than or equal to 1000 microns, less than or equal to 900 microns, less than or equal to 800 microns, less than or equal to 700 microns, less than or equal to 600 microns, less than or equal to 500 microns, less than or equal to 400 microns, or less. Combinations of these ranges are also possible. For example, the expanded core may have a thickness of greater than or equal to 200 microns and less than or equal to 1000 microns. Other expanded core thicknesses are also possible.

In some embodiments, an expanded core (e.g., an as-molded core or a core of an article that has hardened in the mold cavity prior to extraction from the mold cavity) has a thickness that is greater than or equal to 10%, greater than or equal to 20%, greater than or equal to 30%, greater than or equal to 40%, or greater than or equal to 50% of a total thickness of the article. In some embodiments, the expanded core has a thickness that is less than or equal to 80%, less than or equal to 70%, less than or equal to 60%, or less of the total thickness of the article. Combinations of these ranges are also possible. For example, in some embodiments the expanded core may have a thickness greater than or equal to 10% and less than or equal to 80% of the total thickness of the article.

Any of a variety of suitable polymeric materials (e.g., a first polymeric material used to form the skin layer, a second polymeric material used to form the foam core) may be used for forming articles may be used with the methods described herein. Such polymeric materials, in some cases, are or comprise thermoplastics. Polymeric materials (e.g., first polymeric materials and/or second polymeric materials) may be amorphous, at least partially crystalline, or fully crystalline. Polymeric materials (e.g., first polymeric materials and/or second polymeric materials) may comprise polyolefins (e.g., polyethylene and polypropylene), styrenic polymers (e.g., polystyrene, ABS), fluoropolymers, polyamides, polyimides, polyesters, and/or copolymers or mixtures of such polymeric materials. The polymeric material used may depend upon the application in which the article is ultimately utilized. For example, the polymeric material may be a food-grade polymeric material (e.g., a polymeric material that does not contain toxic, carcinogenic, or distasteful additives in a sufficient quantity to taint food exposed to the polymer).

In some embodiments, at least one polymeric material of the article (e.g., used to form the skin) is or comprises virgin polymer. "Virgin polymer" generally refers to a polymer resin originating from a chemical feedstock (e.g., crude oil or natural gas, a bio-based feedstock, or a renewable feedstock) that has never been used or processed prior to its use formation into an article as described herein. The term "virgin polymer" may be used herein to describe the virgin polymer resin added to a fluid flow, to the polymeric material within the fluid flow, or to the polymeric material in a formed article that resulted from the input of polymer resin. If the formed article were subsequently melted and reprocessed, the polymer would no longer be considered virgin polymer.

In some embodiments, at least one polymeric material of the article is or comprises recycled polymer. For example, the second polymeric material may comprise recycled polymer. "Recycled polymer" generally refers to a polymeric material that has been reformed from an initial form. For example, a recycled polymer comprise post-consumer content (content originating from a consumer product) and/or post-industrial content (for example, waste polymer resulting from an industrial process, which has been processed but has never entered a consumer product). The recycled polymer may alternatively be "chemically recycled," meaning that it is a polymer resin originating from a chemical feedstock produced by the chemical processing of post-consumer or post-industrial content. In some embodiments, the recycled polymer described herein is a recycled polymer that has not been chemically recycled.

Recycled polymers may have a number of disadvantageous properties, resulting from their impurity and/or from damage to the polymer that may occur during initial processing or regrinding/repelletizing. For example, an article comprising recycled polymer may have inferior mechanical properties, relative to an otherwise identical article comprising purely virgin material.

The recycled polymer may be or comprise post-consumer regrind. The post-consumer regrind may comprise mechanical regrind (i.e., a mixture of regrind flakes), mechanically modified regrind (i.e., regrind flakes mixed or agitated with stabilizing additives in a blend), or chemically modified regrind (i.e., regrind flakes that have been reprocessed by melting together with stabilizing additives). The second polymeric material also comprise virgin polymer, in some embodiments.

The first polymeric material may be chosen to have properties compatible with the second polymeric material (described in greater detail below). For example, the first polymeric material and the second polymeric material may be chosen to have similar thermal properties, and/or may be chosen to have relatively good adhesion to one another. In some embodiments, the first polymeric material and the second polymeric material are both amorphous, or both have similar crystallinities (e.g., the crystallinity of the first polymeric material may be within 10%, within 5%, within 2%, or within 1% of the crystallinity of the second polymeric material).

It may be advantageous for the first polymeric material and the second polymeric material to comprise chemically similar polymers. Without wishing to be bound by any particular theory, chemically similar polymers tend to have similar thermal and mechanical properties, and tend to have better adhesion to one another. For example, the first polymeric material and the second polymeric material may both comprise a polyolefin, such as polyethylene or polypropylene. In some embodiments, the first polymeric material and the second polymeric material comprise a same polymer. For example, the first polymeric material and the second polymeric material comprise the same polyolefin. The first polymeric material and the second polymeric material may comprise a different polymeric material. For example, the first polymeric material may comprise polyethylene and the second polymeric material may comprise no polyethylene, in some embodiments. The first polymeric material may comprise a same polymeric material and a different polymeric material. For example, the first polymeric material could comprise a mixture of polyethylene and polypropylene, and the second polymeric material could comprise polyethylene but not polypropylene, in some embodiments. The first polymeric material may comprise a smaller proportion of recycled polymer than the second polymeric material.

The core may be formed principally from a second polymeric material included in the second fluid stream. The second polymeric material may be or comprise a recycled polymer. In some embodiments, the second polymeric material comprises greater than or equal to 1 wt %, greater than or equal to 5 wt %, greater than or equal to 25 wt %, greater than or equal to 50 wt % recycled polymer. In some embodiments, the second polymeric material comprises less than or equal to 100 wt %, less than or equal to wt %, or less than or equal to 50 wt % recycled polymer. Combinations of these ranges are also possible. For example, the second polymeric material may comprise greater than or equal to 1 wt % and less than or equal to 100 wt %, greater than or equal to wt % and less than or equal to 75 wt %, or greater than or equal to 25 wt % and less than or equal to 50 wt % recycled polymer. In some embodiments, recycled polymer is preferred for its reduced cost and waste. Thus, an advantage of the articles and associated methods described herein is the preservation of the mechanical and aesthetic advantages of virgin polymers in articles comprising an increased proportion of recycled polymers.

The article as a whole may comprise any of a variety of appropriate amounts of recycled polymer. For example, in some embodiments, the article comprises greater than or equal to 1 wt %, greater than or equal to 5 wt %, greater than or equal to 25 wt %, greater than or equal to 50 wt % recycled polymer. In some embodiments, the article comprises less than or equal to 100 wt %, less than or equal to 90 wt %, less than or equal to 75 wt %, or less than or equal to 50 wt % recycled polymer. Combinations of these ranges are also possible. For example, the article may comprise greater than or equal to 1 wt % and less than or equal to 100 wt %, greater than or equal to 25 wt % and less than or equal to 75 wt %, or greater than or equal to 25 wt % and less than or equal to 50 wt % recycled polymer. In some embodiments, most of the recycled polymer of the article is within the core of the article.

In general, the articles described herein have a certain cell size. For example, the core of an article may have a certain cell size. In some embodiments, the skin layer may have a certain cell size, although in some embodiments the skin layer is fully dense and does not have a cell size.

In some embodiments, the article comprises a foamed core. The core may be an expanded core, as discussed above. The core can have a density reduction, with respect to solid polymer. As used herein, the density reduction is the percentage of the density of the solid polymer. It can be measured by the following equation:

Core Density Reduction %=100×[1−(density of the core of the polymer foam article/density of solid polymer)]

For example, if the core of the foam article has a density of 0.85 g/cm$^3$ and the solid polymer has a density of 1.0 g/cm$^3$, then the density reduction of the core is 15%.

The particular density reduction of the core may depend upon the application. In some embodiments, the density reduction of an expanded core is greater than or equal to 2%, greater than or equal to 5%, greater than or equal to 10%, or greater than or equal to 25%. In some embodiments, the density reduction of the expanded core is less than or equal to 100%, less than or equal to 75%, less than or equal to 50%, or less than or equal to 25%. It should be understood that any suitable ranges defined by the above-noted minimum and maximum values may be used (e.g., between 2% and 100%, between 25% and 75%, between 25% and 50%, etc.).

In some embodiments, the density reduction of a non-expanded core (e.g., an as-molded core or a core of an article that has hardened in the mold cavity prior to extraction from the mold cavity) is less than or equal to 10%, less than or equal to 5%, less than or equal to 3%, or less than or equal to 2%. The density reduction of the non-expanded core may be greater than 0%, greater than or equal to 0.5% or greater than or equal to 1%. It should be understood that any suitable ranges defined by the above-noted minimum and maximum values may be used (e.g., between 0% and 10%, between 0.5% and 5%, between 0.5% and 3%, etc.).

Similarly, the density reduction of the article may also be characterized as a percentage of the density of the solid polymer(s) of the article. The density reduction of the article may be defined similarly to the density reduction of the core, by the equation:

Article Density Reduction %=100%×[1−(density of the article/weighted average density of the solid polymer of the article)].

For example, if the article has a density of 0.9 g/cm$^3$, the core contributes 15% of the mass of the article and has a density (absent pores or other space-occupying defects) of 1.2 g/cm$^3$, and the skin layer contributes 85% of the mass of the article and has an average density of 1.0 g/cm$^3$, then the weighted average density of solid polymer of the article is (15%×1.2 g/cm$^{3+85}$%×1.0 g/cm$^3$)/(15%+85%)=1.03 g/cm$^3$ and article density reduction is 100%×[1−(0.9/1.03)]=13%.

The density reduction of the article may depend upon the application. In some embodiments, the density reduction of the article is greater than 0%, greater than or equal to 1%, greater than or equal to 5%, greater than or equal to 10%, greater than or equal to 20%, or greater. In some embodiments, the density reduction of the article density is less than or equal to 40%, less than or equal to 30%, less than or equal to 20%, less than or equal to 10%, or less. It should be understood that any suitable ranges defined by the above-noted minimum and maximum values may be used (e.g., between 0% and 40%, between 1% and 40%, between 10% and 30%, etc.).

In some embodiments, the expansion of the core may produce a foam structure with one or more advantageous mechanical or thermal properties. For example, the core may have a box structure, which generally describes a foam comprising elongated, honeycomb-like cells. Without wishing to be bound by any particular theory, expansion a foam with a box structure may increase the stiffness of the foam. Therefore, in some embodiments, increasing a thickness of the core of an article during expansion of the core increases the stiffness of the core. Thus, expansion of the article may be associated with an advantageous increase in stiffness without altering the weight of the article.

For example, an article comprising an expanded foam core may have a flexural stiffness that is greater than or equal to than 110%, greater than or equal to 125%, greater than or equal to 150% greater than 200%, or greater than or equal to 250% of the flexural stiffness of an otherwise identical non-expanded article. In some embodiments, an expanded foam core has a thermal conductivity that is reduced by an amount of less than or equal to 400%, less than or equal to 300%, or less than or equal to 250 of the flexural stiffness of an otherwise identical non-expanded article. It should be understood that any suitable ranges defined by the above-noted minimum and maximum values may be used (e.g., between 3% and 75%, between 25% and 75%, between 25% and 50%, etc.).

Similarly, without wishing to be bound by theory, an expanded foam core may have a reduced thermal conductivity as a result of the smaller proportion of an area cross-section occupied by the polymeric material of the core, according to some embodiments. Thus, expansion of the article may be associated with an advantageous increase in thermal insulation without increasing the weight of the article.

For example, an expanded foam core may have a thermal conductivity that is reduced by an amount of greater than 3%, greater than or equal to 5%, greater than or equal to 8% greater than 15%, or greater than or equal to 33%, relative to the thermal conductivity of the solid polymer of the core. In some embodiments, an expanded foam core has a thermal conductivity that is reduced by an amount of less than or equal to 75%, less than or equal to 50%, or less than or equal to 25%, relative to the thermal conductivity of the solid polymer of the core. It should be understood that any suitable ranges defined by the above-noted minimum and maximum values may be used (e.g., between 3% and 75%, between 25% and 75%, between 25% and 50%, etc.).

In some embodiments, polymeric materials described herein may be combined with additives other than blowing agents. For example, in some embodiments, polymeric materials are combined with nucleating agents (e.g., talc), fillers, and/or colorants. The first fluid stream and the second fluid stream may comprise additives that are the same or different, or one or both of the fluid streams may comprise no additives. Thus, the core (e.g., the foamed core) and the skin layer of the article may comprise additives that are the same or different, or may comprise no additives.

The first fluid stream may comprise a colorant, in some embodiments. Colorants may be more aesthetically appealing (e.g., brighter, purer in tone) in virgin polymer than in recycled polymer. One advantage of the techniques taught by the present disclosure is that they may be used to produce articles including recycled polymer in relatively high amounts, while retaining a skin layer comprising the virgin material and the colorant. Such an article may be more aesthetically appealing than an article comprising homogeneously distributed recycled polymer and colorant.

The following examples are intended to illustrate certain embodiments of the present invention, but do not exemplify the full scope of the invention.

Example 1

Figure 5A:
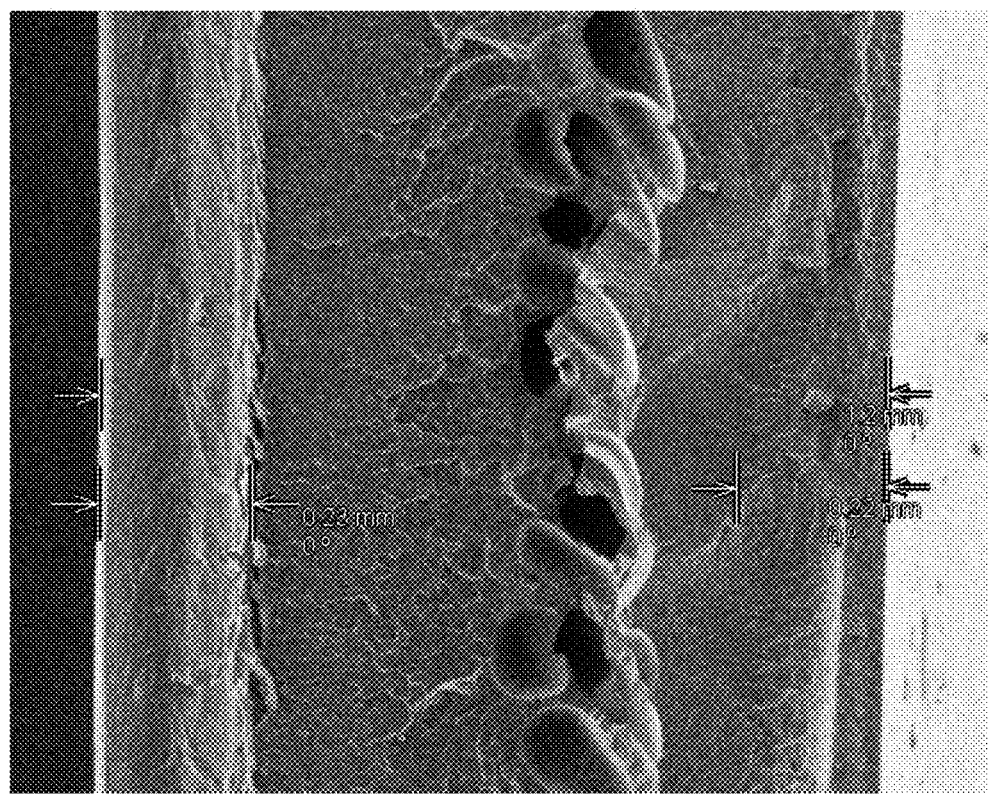
FIGS. 5A-5B present exemplary scanning electron micrographs of cross-sections of articles, according to some embodiments.

This example describes preparation of non-limiting injection molded articles prepared using methods described herein. In this example, the articles were prepared by co-injection molding a food-grade virgin polymer comprising a blue colorant and a non-food-grade recycled polymer. Article 1 was prepared by first injecting the virgin polymer, then injecting the non food-grade recycled polymer, then injecting additional virgin polymer. Once injection was complete, Article 1 hardened in the mold for 12 seconds and was extracted from the mold without an opportunity to expand. The resulting core comprised small pores resulting from the incorporation of the blowing agent. The overall thickness of Article 1 was 1.2 mm, and Article 1 comprised a foamed core with a thickness of 0.2 mm. The foamed core of Article 1 accounted for 25 wt % of the article. The core of Article 1 comprised pores with a size of approximately 100 microns. FIG. 5A shows an exemplary SEM micrograph of a cross-section of Article 1.

Figure 5B:
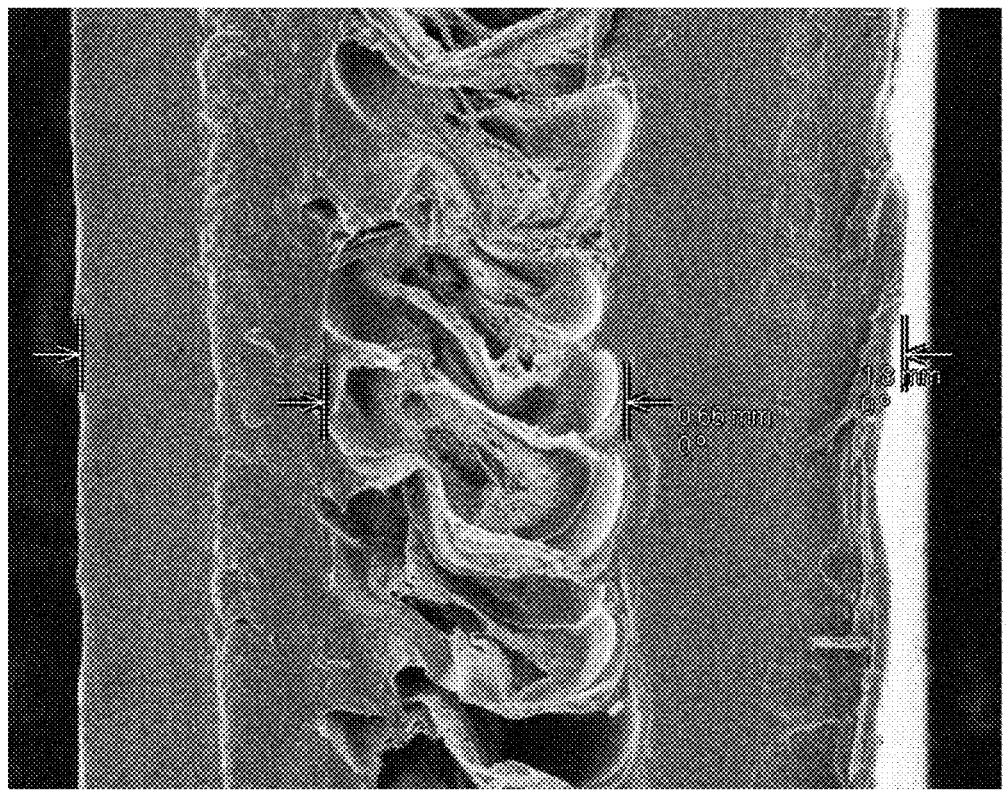

Article 2 was prepared similarly to Article 1. However, before removal of Article 2 from the mold, Article 2, was allowed to cool for 1 second in the mold cavity (forming a skin layer). Afterwards, the mold cavity was expanded and the article was allowed to harden for 11 seconds prior to extraction from the mold cavity. Article 2 was permitted to expand to a thickness of 1.8 mm, including an 0.6 mm thick core. The resulting core of Article 2 comprised highly elongated pores, visible to the naked eye. FIG. 5B shows an exemplary SEM micrograph of a cross-section of Article 2 after expansion.

Visually, the skin layer of Articles 1 and 2 retained its original, translucent blue color, while the foamed core remained white. At the interface between the core and the skin layer, the blue and white coloration blended to form a color gradient, demonstrating that the skin layer was integrally formed with the core, and suggesting the formation of a blended interface between the two layers.

These results demonstrate the successful preparation of an exemplary injection molded article that comprised a skin layer comprising high-quality, virgin material and a core comprising recycled polymer.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

What is claimed is:

1. A method of injection molding an article, comprising:
   injecting a first fluid stream comprising a first polymeric material into a mold cavity;
   injecting a second fluid stream comprising a second polymeric material and a blowing agent into the mold cavity to form a core of an article;
   expanding the mold cavity to permit the core to expand into a foamed core of the article, wherein the first polymeric material forms a skin layer at least partially surrounding the foamed core; and
   extracting the article from the mold cavity; and
   wherein the first polymeric material comprises a virgin polymer and the second polymeric material comprises a recycled polymer.

2. The method of claim 1, wherein the first polymeric material is a virgin polymer.

3. The method of claim 1, wherein the first polymeric material and the second polymeric material comprise a same polymer.

4. The method of claim 1, wherein the first polymeric material and the second polymeric material do not comprise a same polymer.

5. The method of claim 1, wherein the first polymeric material further comprises a colorant.

6. A method of injection molding an article, comprising:
   injecting a first fluid stream comprising a first polymeric material into a mold cavity;
   injecting a second fluid stream comprising a second polymeric material and a blowing agent into the mold cavity to form a core of an article;
   extracting the article from the mold cavity; and
   wherein the first polymeric material comprises a virgin polymer and the second polymeric material comprises a recycled polymer, and
   wherein the article comprises greater than or equal to 25 wt % of recycled polymer.

7. The method of claim 1, wherein the first polymeric material comprises a polyolefin.

8. The method of claim 1, wherein the second polymeric material comprises a polyolefin.

9. The method of claim 1, wherein the first polymeric material and the second polymeric material are amorphous.

10. The method of claim 1, wherein the first polymeric material and the second polymeric material are at least partially crystalline.

11. The method of claim 1, wherein the first fluid stream and the second fluid stream are injected simultaneously for at least a portion of the injection of the first fluid stream.

12. The method of claim 1, wherein the first fluid stream and the second fluid stream are not injected simultaneously.

13. A method of injection molding an article, comprising:
- injecting a first fluid stream comprising a first polymeric material into a mold cavity;
- injecting a second fluid stream comprising a second polymeric material and a blowing agent into the mold cavity to form a core of an article;
- extracting the article from the mold cavity; and
- wherein the first polymeric material comprises a virgin polymer and the second polymeric material comprises a recycled polymer, and
- wherein the second fluid stream is injected prior to completion of the injection of the first fluid stream.

* * * * *